Jan. 23, 1968    J. POOLE    3,364,610
FISHING AND CONTINUITY LIGHT
Filed April 1, 1965    2 Sheets-Sheet 1
Fig. 1.
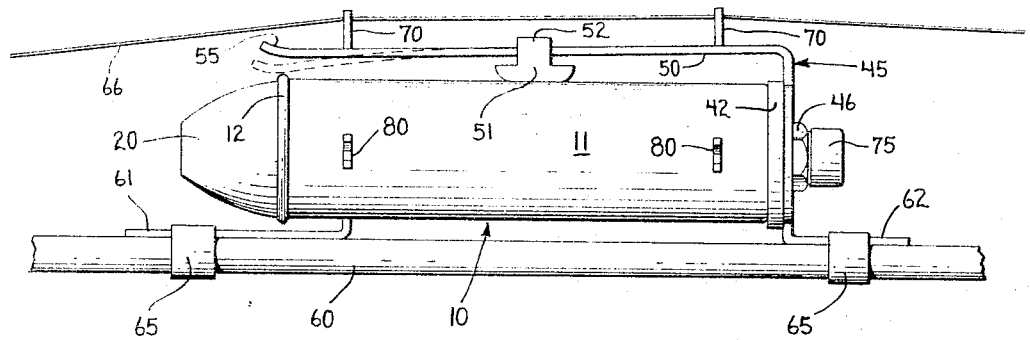
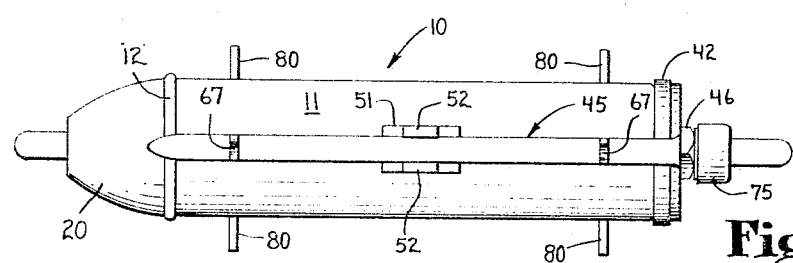
Fig. 2.
Fig. 3.
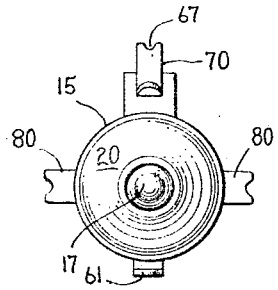
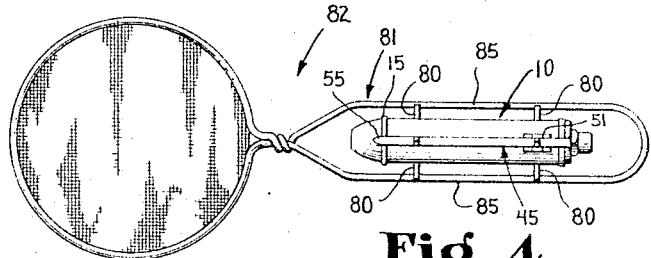
Fig. 4.
Fig. 6.
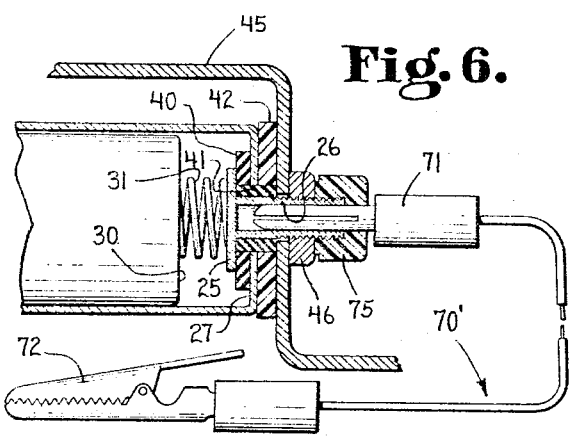
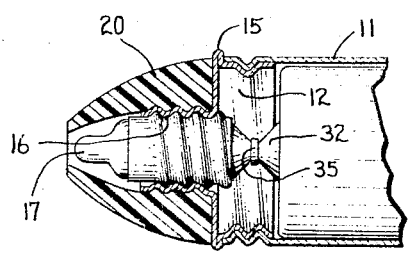
Fig. 5.
INVENTOR.
JACK POOLE
BY Lockwood, Woodard, Smith & Weikart
Attorneys

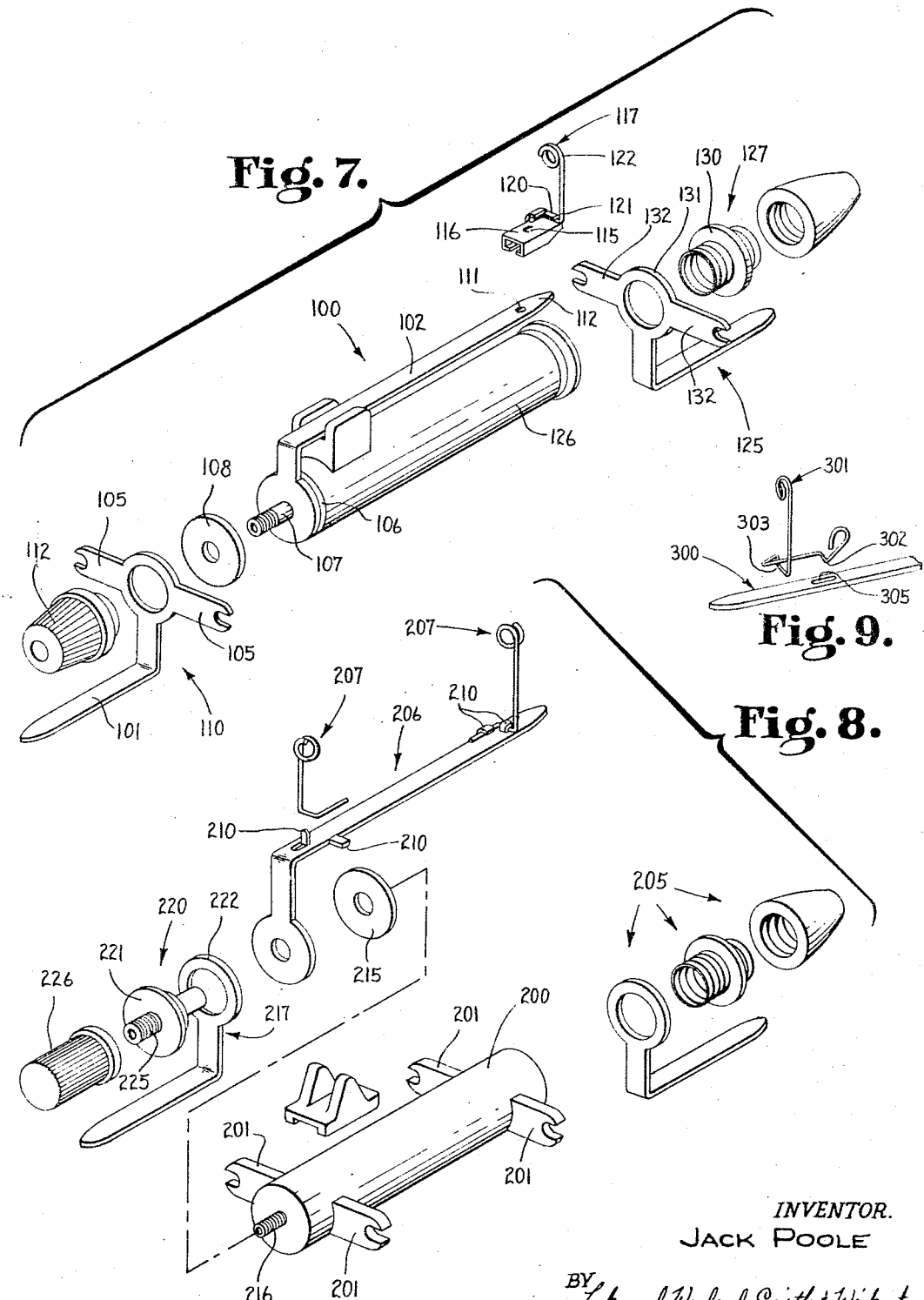

United States Patent Office 3,364,610
Patented Jan. 23, 1968

3,364,610
FISHING AND CONTINUITY LIGHT
Jack Poole, 3202 Dunbar Drive,
Marion, Ind. 46952
Filed Apr. 1, 1965, Ser. No. 444,709
3 Claims. (Cl. 43—17)

ABSTRACT OF THE DISCLOSURE

A signalling light mountable on a fishing pole for notifying the fisherman of a bite and including a spring biased arm which can be adjusted to adjust the amount of force necessary to energize the light. The light also includes projections for mounting it in the handle of a dip net and also includes a jack adapting it for use as a continuity tester.

---

The present invention relates to a signalling device finding particular utility in fishing and as a continuity tester.

For those who fish at night with a rod or pole, some form of signalling means is desirable for notifying the fisherman when he has a bite. Various devices have been provided with such an object in mind but without complete success. For example, it is desirable that the device be adjustable so as to indicate pulls only above a given amount of force. One such situation might involve a live minnow on the fishing line who is providing relatively small pulls which the fisherman does not desire to be indicated by the signalling device. Consequently, an important object of the present invention is to provide a signalling device which can be adjusted to indicate only fishing-line pulls above a given intensity.

Another object of the present invention is to provide an improved signalling arrangement.

Still another object of this invention is to provide a relatively inexpensive signalling arrangement.

A further object of the invention is to provide a light usable for lighting a dip net for night time use by a fisherman.

Still another object of the present invention is to provide a continuity tester.

Still another object of the present invention is to provide an apparatus usable as a continuity tester, a dip net light and means for signalling a bite on a fishing line.

Related objects and advantages will become apparent as the description proceeds.

One embodiment of the present invention might involve; in a fishing signal arrangement including a flashlight with a housing electrically connected to one terminal of the light bulb, a battery in said housing, said battery having one terminal thereof electrically connected to the other terminal of said light bulb; the improvement which comprises an arm fixed to one end of said housing but electrically insulated therefrom, said arm being electrically connected to the other terminal of said battery and extending alongside of said housing, an insulating member being received between said arm and said housing, said arm having a stress therein adapted to bias said arm against said housing but for the insulating member interposed therebetween, said insulating member being movable longitudinally of said arm to vary the amount of force necessary to push said arm into contact with said housing, means for mounting said housing on a fishing pole, said arm having recesses adapted to receive a fishing line when said housing is mounted on a fishing pole.

The full nature of the invention will be understood from the accompanying drawings and the following description and claims.

FIG. 1 is a side elevation of the signalling device of the present invention showing it mounted upon a fishing pole.

FIG. 2 is a top plan view of the signalling device of FIG. 1.

FIG. 3 is a rear elevation of the signalling device of FIGS. 1 and 2.

FIG. 4 is a plan view of a dip net having the apparatus of FIGS. 2 and 3 mounted in the handle thereof.

FIG. 5 is an enlarged longitudinal section of the signalling device of FIGS. 1–4 with portions broken away.

FIG. 6 is a section similar to FIG. 5 of the opposite end of the signalling device and showing a lead with alligator clip for use with a signalling device when it functions as a continuity tester.

FIG. 7 is an exploded perspective view of an alternative embodiment of the present invention.

FIG. 8 is an exploded perspective view similar to FIG. 7 of still another embodiment of the present invention.

FIG. 9 is a fragmentary exploded perspective view of a further embodiment of the present invention.

For the purposes of promoting an understanding of the principles of the invention, reference will now be made to the embodiment illustrated in the drawing and specific language will be used to describe the same. It will nevertheless be understand that no limitation of the scope of the invention is thereby intended, such alterations and further modifications in the illustrated device, and such further applications of the principles of the invention as illustrated therein being contemplated as would normally occur to one skilled in the art to which the invention relates.

Referring now more particularly to the drawings, there is illustrated a signalling device 10 which includes an elongated cylindrical housing 11. Threadedly mounted within the forward end of the housing 11 is a lamp socket 12 which has a radially outwardly projecting flange 15 extending radially outwardly beyond the outer periphery of the housing 11. The lamp socket 12 has a threaded portion 16 which performs the double function of threadedly mounting the electric light and threadedly mounting the plastic light-protecting element 20.

Received within the housing 11 is a circular disc 25 of electrically conductive material. An externally threaded conductive tubular member 26 is fixed to the central portion of the member 25 and projects axially of the housing 11 through the rearward end 27 of the housing. The members 25 and 26 are electrically connected to the base 30 of the battery by a compression spring 31 which forces the battery forwardly of the case and the center terminal 32 of the battery against the center terminal 35 of the light bulb. The elecrically conductive members 25 and 26 are insulated from the housing 11 by three annular insulating elements 40, 41 and 42.

An elongated arm 45 of electrically conductive material is fixed with relation to the housing 11 by means of a nut 46 threadedly received upon external threads on the tube 26. The nut 46, which is also of electrically conductive material, mounts the arm 45 so that it extends generally parallel to the external surface of the housing 11 as shown in FIGS. 1–3. The nut 46 also functions to insure good electrical connection between the tubular member 26 and the arm 45. The portion 50 of the arm 45, which is also of electrically conductive material, has an inherent stress or bias thereon which would normally hold the arm against the light socket flange 15 but for an insulating member 51 received between the portion 50 of the arm and the housing. The insulating member 51 has a pair of projections 52 which extend on opposite sides of the arm 45 and which permit the insulating member 51 to be slid longitudinally of the arm and housing to vary the amount of force necessary to force the distal end 55 of the arm 45 against the lamp socket 12.

As can be seen in FIG. 1, the signalling device is mounted on a fishing pole 60 by means of oppositely projecting elements 61 and 62 both of which are fixed relative to the housing 11. The element 61 is fixed directly to the housing 11 while the element 62 forms an extension of the arm 45. A pair of generally C-shaped clamps 65 are used to mount the signalling device to the pole 60. In the present embodiment of the device, the pole 60 should be of non-conductive material because electrical connection of the members 61 and 62 can close the circuit to the light bulb. The fishing line 66 is trained over the arm 45 and is received within recesses 67 opening away from the pole 60 and formed in the distal ends of projections 70 secured to the portion 50 of the arm 45.

It can be appreciated that when a fish pulls on the line 66 a force is exerted through the forward projection 70 tending to cause the distal end 55 of the arm 45 to be forced against the lamp socket 12 closing the circuit between the battery and the light signalling the fisherman that he has a bite. When insulating member 51 is adjusted leftwardly as viewed in FIG. 1, a greater force on the line is necessary in order to push the distal end 55 against the flange 15. In like manner, adjustment of the insulating member 51 rightwardly reduces the amount of force on the line 66 necessary to energize the light.

The present device can be used to test a fuse by means of the elements 61 and 62 which are used as probes and are touched to the opposite ends of the fuse. A further use of the present device as a continuity tester is effected with the lead 70'. The lead 70' includes a male jack 71 which is inserted into the female tubular member 26 making electrical connection between the tubular member, the male jack, the wire in the lead 70' and the alligator clip 72. A cap nut 75 of insulating material is threadedly received upon the tubular member 26. The alligator clip 72 is connected to the chassis of an apparatus and the probe 61 engaged with various parts to test for electrical shorts or continuity.

The present apparatus has a further application as illustrated in FIG. 4. Projecting from and fixedly mounted on opposite sides of the housing 11 and at 90 degrees from the arm 45 are mounting elements 80. Each of the mounting elements 80 has a recess at its distal end which is used to mount the device 10 in the handle 81 of the dip net. The handle 81 is formed of resilient wire which is spread to insert the device 10 between the two generally parallel lengths 85 of the wire 81. When the device is being used as illustrated in FIG. 4, the insulating member 51 is moved rightwardly a sufficient distance to permit the inherent stress in the arm 45 to force the arm into an engagement with the flange 15 turning on the light. The dip net 82 can then be used for dipping minnows and for similar purposes.

Referring now more particularly to FIG. 7, there is illustrated a signalling device 100 which is in many respects identical to the signalling device of FIGS. 1-6. The device of FIG. 7, however, differs from the above described embodiment in that the rear probe 101 is separate from the actuating arm 102 and forms a part of the sidewardly or oppositely extending projections 105 used for mounting the signalling device on a dip net. When the device of FIG. 7 is used with a dip net, the arm 102 and the washer 106 which corresponds to the washer 42 are both removed from the tubular member 107 corresponding to the tubular member 26. The probe member 110 including the probe 101 is then placed upon the tubular member 107 prior to the placing of the insulating washer 106 and the arm 102 thereon. Lastly the electrically conductive washer 108 and the nut 112 are assembled on the externally threaded tubular member 107. By such assembly the device of FIG. 7 can be used with a dip net without the light bulb being energized through the wires of the handle of the dip net.

The device of FIG. 7 can be used with the probe 101 electrically connected to the tubular member 107. This is accomplished by assembling the apparatus in the manner suggested in FIG. 7, that is, with the washer 106 first, the arm 102 next and the washer 108, the member 110 and the nut 112 last in that order. The arm 102 has a dimple 111 at its distal end 112. The dimple 111 registers with a dimple 115 in a C-shaped member 116 adapted to be slid onto the distal end of the arm 102 to provide a fishing-line eye 117. The fishing-line eye 117 consists of a wire which is clamped by the portion 120 at its proximal end 121 and which is curled at its distal end 122 in a spiral configuration as illustrated. This spiral shape makes possible placing the line through the eye without threading.

One further distinction between the embodiment of FIG. 7 and that of FIGS. 1-6 is the forward probe assembly 125 which is retained against the housing 126 by the socket 127 which has a flange 130 adapted to engage the annular portion 131 of the probe assembly 125. The forward probe assembly includes sidewardly extending projections 132 corresponding to projections 80. One advantage of the embodiment of FIG. 7 is the fact that both the probe member 110 and probe member 125 can be removed so that the light can be used as a flashlight. When so used, the arm 102 can act as a clip for retaining the line on the shirt pocket.

In other respects the embodiment of FIG. 7 is identical or similar to the embodiment of FIGS. 1-6.

Referring now more particularly to FIG. 8, still a further embodiment of the invention is illustrated, said embodiment including a plastic housing 200 having cast integrally thereon projections 201 which correspond to the projections 80 of the first described embodiment. The forward end assembly including the parts 205 is identical to the forward end assembly of FIG. 7 except for the elimination of the projections 132. At the rearward end of the housing, however, there is mounted an arm 206 which in turn mounts a pair of fishing-line eyes 207. The eyes 207 are generally similar to or identical to the eye 117 and are clamped to the arm 206 by bendable projections 210. The embodiments of FIGS. 7 and 8 are particularly useful with a fishing rod held in such a manner that the fishing line is below the rod.

The annular member 215 is a spacer washer which is placed upon the projection 216 corresponding to the projection 26 of FIG. 6. The arm 206 electrically contacts the tubular member 216 and is received thereon. The rearward probe 217 is held in engagement with the arm 206 by an internally threaded member 220 which also incorporates radially extending portion 221 adapted to engage the annular portion 222 of the probe 217. The member 220 is externally threaded at 225 and is also hollow and formed of electrically conductive material so that the embodiment of FIG. 8 can be used as a continuity tester in the manner above described. When the present device is not being used as a continuity tester, an internally threaded cap 226 can be screwed down on the externally threaded portion 225.

FIG. 9 illustrates an arm 300 of another embodiment of this invention, said arm corresponding to 45, 102 or 206 and shows eye 301 which is snapped into place on the arm 300 with the projection 302 extending into aperture 305 and loop 303 surrounding the arm. The eye 301 functions similarly to the above described eyes 117 and 207.

It will be evident from the above description that the present invention provides a signalling device which can be adjusted to indicate only pulls on the fishing line which are greater than a given intensity. It will also be evident that the present invention provides an apparatus which can be used as a continuity tester, as a light for a dip net and as an inexpensive signalling device for night fishing.

A further advantage of the present device is the fact that the present device can be easily cleaned of corrosion because unlike conventional flashlights all contacts are easily accessible.

While the invention has been illustrated and described in detail in the drawings and foregoing description, the same is to be considered as illustrative and not restrictive in character, it being understood that only the preferred embodiment has been shown and described and that all changes and modifications that come within the spirit of the invention and the scope of the claims are also desired to be protected. The device of the present invention might be modified for use with a bell or buzzer in place of the light. Of course, the apparatus could not then be used for lighting the dip net. Other possible modifications might be the removal of the projections 80 particularly if a bell or buzzer is used. Conceivably it would also be desirable to make the projections 70 luminous. Further possible uses of the device are a conventional flashlight or with a landing net.

The invention claimed is:

1. In a signal arrangement including a flashlight with a housing assembly electrically connected to one terminal of the light bulb, a battery in said housing assembly, said battery having one terminal thereof electrically connected to the other terminal of said light bulb, the improvement which comprises an arm fixed to one end of said housing assembly but electrically insulated therefrom, said arm being electrically connected to the other terminal of said battery and extending alongside of said housing assembly, an insulating member being received between said arm and said housing assembly, said arm having a stress therein adapted to bias said arm against said housing assembly but for the insulating member interposed therebetween, said insulating member being movable longitudinally of said arm to vary the amount of force necessary to push said arm into contact with said housing assembly, said arm having a dimple at the distal end thereof, a C-shaped member received on said arm at the distal end thereof, said C-shaped member having a dimple registering with said arm dimple and locking said C-shaped member in place on said arm, a fishing-line-receiving eye mounted on said C-shaped member and formed in a spiral shape.

2. In a signal arrangement including a flashlight with a housing assembly electrically connected to one terminal of the light bulb, a battery in said housing assembly, said battery having one terminal thereof electrically connected to the other terminal of said light bulb, the improvement which comprises an arm fixed to one end of said housing assembly but electrically insulated therefrom, said arm being electrically connected to the other terminal of said battery and extending alongside of said housing assembly, an insulating member being received between said arm and said housing assembly, said arm having a stress therein adapted to bias said arm against said housing assembly but for the insulating member interposed therebetween, said insulating member being movable longitudinally of said arm to vary the amount of force necessary to push said arm into contact with said housing assembly, a pair of probe members, one of said probe members being selectively mountable in one of two positions a first of which is between said insulating member and said housing in electrical contact with said housing and a second of which is outboard of said arm relative to said housing and in electrical connection with said arm, the other of said probe members being mounted on said housing and in electrical contact therewith, said probe members each additionally including a pair of oppositely extending projections with recesses in their ends for mounting said arrangement on a fishing net.

3. A signal arrangement comprising a cylindrical housing, a battery received in said housing, an electrically conductive member electrically connected to the base of said battery and having a tubular portion projecting through the rearward end of said housing, means for insulating said member from said housing, said tubular portion being externally threaded, an electrically conductive arm having an opening therethrough which is threaded onto said tubular portion, said arm being insulated from said casing by said means, a nut threaded onto said tubular portion and bearing tightly against said arm to mount it securely relative to said casing and against said means, said arm extending parallel to and alongside of said housing and projecting forwardly of said housing, a light socket threaded into the forward end of said housing, a light bulb threaded into said socket and contacting the center terminal of said battery, said arm being inherently biased against said socket, an insulating member received between said arm and said casing and slidable along the length of said casing to vary the amount of force necessary to push the distal end of said arm against said casing to light the light, two pair of projections integral with said housing with one pair of said projections spaced axially of the other pair of said projections, one projection of each pair spaced around the periphery of said housing by 180 degrees relative to the other projection of each pair, each of said projections having a recess in the distal end thereof.

References Cited

UNITED STATES PATENTS

| 2,195,692 | 4/1940 | Bushey | 43—17 |
| 2,714,270 | 8/1955 | Premo | 43—17 |
| 3,077,693 | 2/1963 | Wallin | 43—11 |
| 3,188,767 | 6/1965 | Finefield | 43—17 |

FOREIGN PATENTS

| 463,794 | 3/1950 | Canada. |
| 178,135 | 9/1935 | Switzerland. |

SAMUEL KOREN, *Primary Examiner.*

WARNER H. CAMP, *Examiner.*